United States Patent
Kobayashi et al.

(10) Patent No.: US 7,826,935 B2
(45) Date of Patent: Nov. 2, 2010

(54) PROCESSING UNIT FOR GENERATING CONTROL SIGNAL, CONTROLLER WITH THE PROCESSING UNIT FOR CONTROLLING ACTUATOR, AND PROGRAM EXECUTED IN THE PROCESSING UNIT

(75) Inventors: Hidetoshi Kobayashi, Anjo (JP); Eiji Takayama, Anjo (JP)

(73) Assignee: Denso Corporation, Kariya, Aichi-Pref. (JP)

(*) Notice: Subject to any disclaimer, the term of this patent is extended or adjusted under 35 U.S.C. 154(b) by 677 days.

(21) Appl. No.: 11/730,998

(22) Filed: Apr. 5, 2007

(65) Prior Publication Data

US 2007/0255931 A1    Nov. 1, 2007

(30) Foreign Application Priority Data

Apr. 27, 2006    (JP)    ............................. 2006-124118

(51) Int. Cl.
*G06F 9/44*    (2006.01)
(52) U.S. Cl. .............................. 701/1; 701/97; 712/222
(58) Field of Classification Search ................. 712/222; 701/97; 708/530, 533, 534
See application file for complete search history.

(56) References Cited

U.S. PATENT DOCUMENTS

| | | | | |
|---|---|---|---|---|
| 4,208,722 A | * | 6/1980 | Rasala et al. ................. | 708/628 |
| 4,527,894 A | * | 7/1985 | Goede et al. .................. | 356/28 |
| 5,070,475 A | * | 12/1991 | Normoyle et al. ........... | 712/211 |
| 5,158,059 A | * | 10/1992 | Kuroda ......................... | 123/690 |
| 5,222,037 A | * | 6/1993 | Taniguchi .................... | 708/497 |
| 5,325,314 A | * | 6/1994 | Lippmann et al. ............. | 702/86 |
| 5,428,769 A | * | 6/1995 | Glaser et al. ................... | 700/4 |

(Continued)

FOREIGN PATENT DOCUMENTS

JP    1-175626    7/1989

(Continued)

OTHER PUBLICATIONS

Japanese Office Action dated Feb. 9, 2010, issued in corresponding Japanese Application No. 2006-124118, with English translation.

(Continued)

*Primary Examiner*—Khoi Tran
*Assistant Examiner*—Kyung J Kim
(74) *Attorney, Agent, or Firm*—Nixon & Vanderhye PC

(57) ABSTRACT

A controller with a processing unit and a floating-point processor is disposed in a vehicle to control an actuator according to detected parameters sent from sensors. The processor generates a floating-point control parameter indicating a first quantity of control from the detected parameters at floating-point calculations, and the unit generates a fixed-point control parameter indicating a second quantity of control from the detected parameters at fixed-point calculations. The unit converts the floating-point control parameter into a converted control parameter of fixed-point representation and judges from both the converted control parameter and the fixed-point control parameter whether a failure has occurred in the processor. When no failure has occurred in the processor, the unit generates a control signal from the floating-point control parameter. The actuator is operated according to the control signal so as to give the first quantity of control to a controlled object.

6 Claims, 7 Drawing Sheets

U.S. PATENT DOCUMENTS

| | | | | |
|---|---|---|---|---|
| 5,548,545 A * | 8/1996 | Brashears et al. | ........... | 708/495 |
| 5,608,846 A * | 3/1997 | Mitsubuchi et al. | ........... | 706/59 |
| 5,620,608 A * | 4/1997 | Rosa et al. | .................. | 210/739 |
| 5,678,526 A * | 10/1997 | Cullen et al. | ................ | 123/690 |
| 5,751,611 A * | 5/1998 | Jamieson | ..................... | 345/35 |
| 6,049,343 A * | 4/2000 | Abe et al. | .................... | 345/501 |
| 6,144,977 A * | 11/2000 | Giangarra et al. | ........... | 708/204 |
| 6,292,215 B1 * | 9/2001 | Vincent | ...................... | 348/169 |
| 6,603,481 B1 * | 8/2003 | Kawai et al. | ................ | 345/505 |
| 6,671,796 B1 * | 12/2003 | Sudharsanan et al. | ....... | 712/222 |
| 2001/0005808 A1 * | 6/2001 | Kawai et al. | ................ | 701/114 |
| 2003/0028572 A1 * | 2/2003 | Hoskote et al. | ............ | 708/495 |
| 2004/0008890 A1 * | 1/2004 | Clark et al. | ................. | 382/197 |
| 2004/0022444 A1 * | 2/2004 | Rhoads | ....................... | 382/232 |
| 2004/0186866 A1 * | 9/2004 | Koto et al. | .................. | 708/200 |
| 2005/0195975 A1 * | 9/2005 | Kawakita | ..................... | 380/30 |
| 2005/0204194 A1 * | 9/2005 | Curry | ........................... | 714/27 |
| 2006/0015231 A1 * | 1/2006 | Yoshimura et al. | ............ | 701/48 |
| 2006/0094973 A1 * | 5/2006 | Drew | ......................... | 600/544 |
| 2006/0123071 A1 * | 6/2006 | Sonoda et al. | .............. | 708/200 |
| 2007/0067759 A1 * | 3/2007 | Uchida | ........................ | 717/140 |

FOREIGN PATENT DOCUMENTS

| | | |
|---|---|---|
| JP | 1-237720 | 9/1989 |
| JP | A-H11-212762 | 8/1999 |
| JP | 2001-195233 | 7/2001 |
| JP | 2002-318706 | 10/2002 |
| JP | 2005-240631 | 9/2005 |

OTHER PUBLICATIONS

Extended European Search Report dated Nov. 10, 2008 in EP 07006091.8.

* cited by examiner

PROCESSING UNIT FOR GENERATING
CONTROL SIGNAL, CONTROLLER WITH
THE PROCESSING UNIT FOR
CONTROLLING ACTUATOR, AND
PROGRAM EXECUTED IN THE
PROCESSING UNIT

CROSS-REFERENCE TO RELATED
APPLICATION

This application is based upon and claims the benefit of priority of the prior Japanese Patent Application 2006-124118 filed on Apr. 27, 2006 so that the contents of which are incorporated herein by reference.

BACKGROUND OF THE INVENTION

1. Field of the Invention

The present invention relates to a processing unit for generating a control signal indicating a quantity of control, a controller with the processing unit for controlling an actuator to give the quantity of control to a controlled object of a vehicle according to the control signal, and a program executed in the processing unit to generate the control signal.

2. Description of Related Art

A controller with a processing unit is disposed on a vehicle to control actuators. Sensors of the vehicle detect physical values as detected parameters, and the processing unit generates control parameters from the detected parameters. Each control parameter indicates a quantity of control for a controlled object. The controller outputs the control parameters to the respective actuators, and each actuator gives a quantity of control to the corresponding controlled object according to the control parameter. To generate the control parameters, the processing unit has recently performed floating-point calculations in addition to fixed-point calculations.

When the processing unit performs both the fixed-point calculation and floating-point calculation, it is required to use fixed-point data and floating-point data in the processing unit. In this case, a volume of calculations is extraordinary increased in the processing unit. To reduce a volume of calculations in the processing unit, inventors of this specification have proposed an electronic control unit having a floating-point calculation function in Published Japanese Patent First Publication No. 2001-195233. This control unit has a floating-point processor in addition to a central processing unit. The floating-point processor performs floating-point calculations to calculate floating-point data from detected parameters and transmits the floating-point data to the control unit. The control unit performs fixed-point calculations to calculate fixed-point data from other detected parameters. Then, the control unit can output the floating-point data to a part of actuators and output the fixed-point data to the other actuators. Therefore, each actuator can give a quantity of control to a controlled object according to the fixed-point data or floating-point data.

However, in this control unit, there is a probability that a failure or fault may occur in the floating-point processor. In this case, even when the control unit is normally operated, a part of actuators receiving the floating-point data cannot correctly give a quantity of control to a controlled object. Therefore, it is required to detect a failure occurring in the floating-point processor.

SUMMARY OF THE INVENTION

An object of the present invention is to provide, with due consideration to the drawbacks of the conventional control unit, a processing unit which correctly generates a control signal while reliably detecting a failure occurring in a floating-point processor. Further, the object is to provide a controller with the processing unit which controls an actuator to give a quantity of control to a controlled object according to the control signal. Moreover, the object is to provide a computer program executed in the processing unit.

According to a first aspect of this invention, the object is achieved by the provision of a processing unit comprising a parameter receiving section which receives a floating-point control parameter being generated in a floating-point processor from a detected parameter on the basis of a floating-point calculation and indicating a first quantity of control for a controlled object, a parameter generating section which receives the detected parameter and generates a fixed-point control parameter indicating a second quantity of control for the controlled object from the detected parameter on the basis of a fixed-point calculation, a converting section which converts the floating-point control parameter of floating-point representation into a converted control parameter of fixed-point representation, a failure judging section which judges from both the converted control parameter and the fixed-point control parameter whether or not a failure has occurred in the floating-point processor, a signal generating section which generates a control signal from the floating-point control parameter when no failure has occurred in the floating-point processor, and a signal outputting section which outputs the control signal to an actuator.

With this arrangement, the floating-point control parameter is determined so as to have a higher precision than the fixed-point control parameter. When no failure has occurred in the floating-point processor, the floating-point and fixed-point control parameters generated from the detected parameter together become similar to each other. In contrast, when a failure has occurred in the floating-point processor, the floating-point control parameter becomes considerably different from the fixed-point control parameter. Therefore, it can be judged from both the converted control parameter and the fixed-point control parameter whether or not a failure has occurred in the floating-point processor.

When the failure judging section judges that no failure has occurred in the floating-point processor, the signal generating section generates a control signal from the floating-point control parameter, and the signal outputting section outputs the control signal to an actuator. The actuator is operated according to the control signal, so that the actuator gives the first quantity of control to the controlled object.

Accordingly, because the processing unit can reliably use the floating-point control parameter obtained from the normally-operated floating-point processor, the processing unit can correctly generate a control signal with higher precision.

According to a second aspect of this invention, the object is achieved by the provision of a controller comprising the processing unit and a floating-point processor. The floating-point processor is adapted to receive the detected parameter and generate the floating-point control parameter indicating the first quantity of control from the detected parameter on the basis of the floating-point calculation.

Accordingly, the controller can control an actuator such that the actuator gives the first quantity of control to a controlled object according to the control signal correctly generated in the processing unit.

According to a third aspect of this invention, the object is achieved by the provision of a computer program comprising a control parameter receiving segment receiving a floating-point control parameter which is generated from a detected parameter in a floating-point processor on the basis of a floating-point calculation and indicates a first quantity of control, a control parameter generating segment generating a fixed-point control parameter indicating a second quantity of control from the detected parameter on the basis of a fixed-point calculation, a converting segment converting the floating-point control parameter of floating-point representation into a converted control parameter of fixed-point representation, a judging segment judging from both the converted control parameter and the fixed-point control parameter whether or not a failure has occurred in the floating-point processor, a control signal generating segment generating a control signal from the floating-point control parameter when it is judged that no failure has occurred in the floating-point processor, and an outputting segment outputting the control signal to an actuator such that the actuator controls a controlled object by the first quantity of control.

Accordingly, because the program is loaded into the processing unit, the processing unit can correctly generate a control signal by executing the program.

DETAILED DESCRIPTION OF THE PREFERRED EMBODIMENTS

Figure 1:
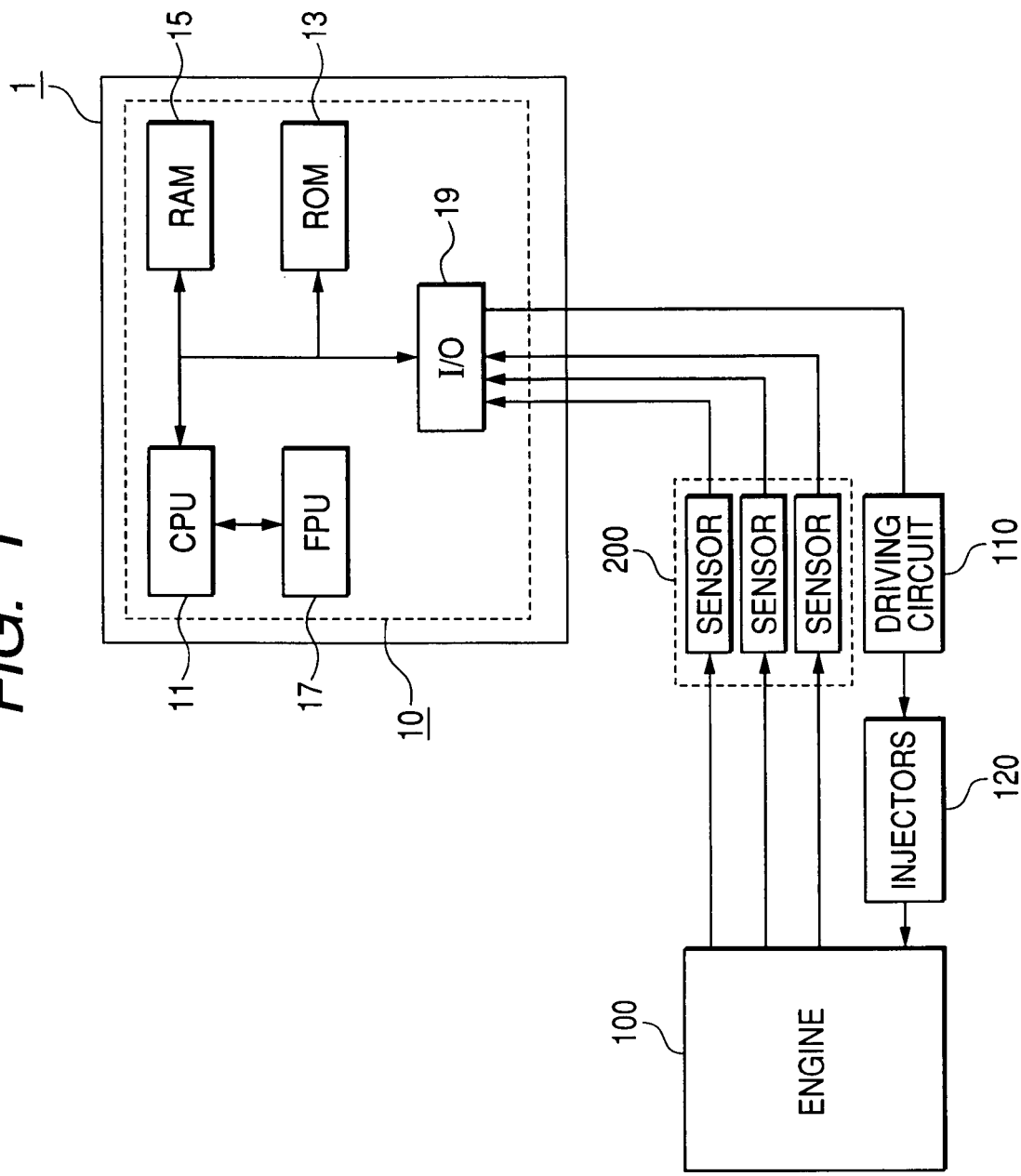
FIG. 1 is a block diagram of an engine control system and an engine according to an embodiment of the present invention.

An embodiment of the present invention will now be described with reference to the accompanying drawings, in which like reference numerals indicate like parts, members or elements throughout the specification unless otherwise indicated.

Embodiment

FIG. 1 is a block diagram of an engine control system and an engine according to an embodiment of the present invention. As shown in FIG. 1, an engine 100 of a vehicle representing a controlled object is operated under control of an engine control system. The engine 100 is formed of a fuel injection type internal combustion engine having a plurality of cylinders. The engine control system has a plurality of sensors 200, an electric control unit (ECU) 1, and an actuator composed of an injector driving circuit 110 and injectors 120. The sensors 200 detect respective physical quantities indicating operation conditions of the engine 100 and running conditions of the vehicle and output detected parameters relating to the physical quantities to the ECU 1. The ECU 1 has a controller 10 formed of a microcomputer.

The controller 10 has a central processing unit (CPU) 11, a read only memory (ROM) 13, a random access memory (RAM) 15, a floating-point processing unit (FPU) 17 and an input-output port (I/O) 19. A plurality of computer programs such as processing programs and control programs are stored in advance in the ROM 13. Data and parameters used and obtained in the CPU 11 and FPU 17 are stored in the RAM 15. The controller 10 receives the detected parameters from the sensors 200 through the I/O port 19. There are many sensors 200 such as an acceleration stroke sensor, an engine speed sensor, a crank sensor, a water temperature sensor and the like. The acceleration stroke sensor 200 detects a stroke position of an accelerator pedal operated by a driver of the vehicle. The engine speed sensor 200 detects a number of revolutions in the engine 100. The crank sensor 200 detects an angle of a crank. The water temperature sensor detects a temperature of a cooling water used for the engine 100.

The CPU 11 and FPU 17 execute the programs of the ROM 13 for the arithmetic processing. The CPU 11 performs fixed-point calculations based on the detected parameters and generates a control parameter of the fixed-point expression. The FPU 17 performs floating-point calculations based on the detected parameters received from the CPU 11 and generates a control parameter of the floating-point expression. The CPU 11 judges from the control parameters whether or not a failure has occurred in the FPU 17. When the CPU 11 judges that no failure has occurred in the FPU 17, the CPU 11 generates a driving control signal from the control parameter of the floating-point expression. The control signal is transmitted to an actuator, and the actuator is operated according to the control signal so as to give a quantity of control to a controlled object. For example, the driving circuit 110 receives the control signal and determines a control quantity of fuel to be injected from the injectors 120 for each revolution cycle of the engine 100, and the injectors 120 driven by the driving circuit 110 discharge the control quantity of fuel to the respective cylinders of the engine 100. Therefore, the engine 100 is operated at an optimum fuel economy under control of the ECU 1.

Figure 2:
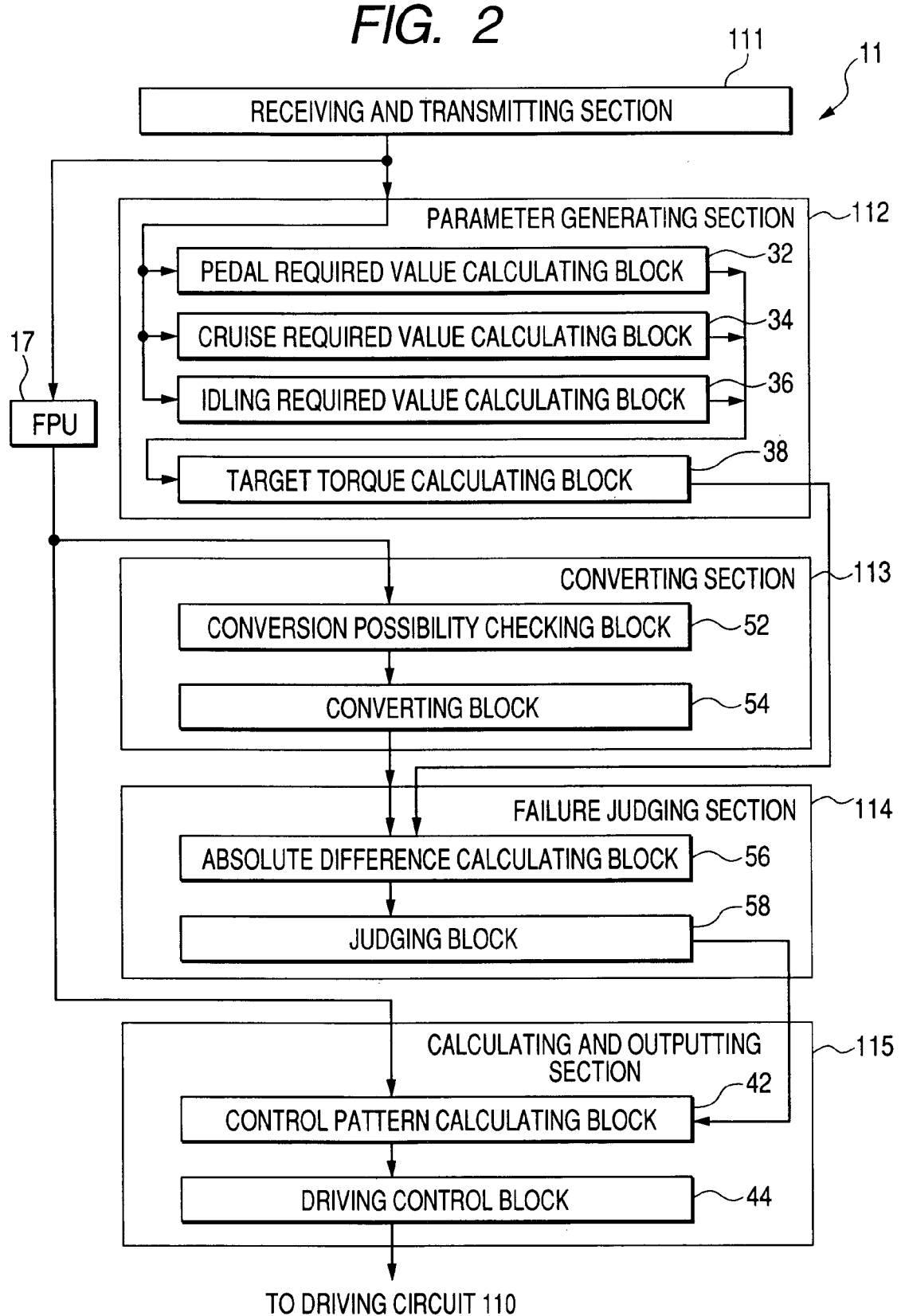
FIG. 2 is a block diagram of a CPU of a controller shown in FIG. 1.
Figure 3:
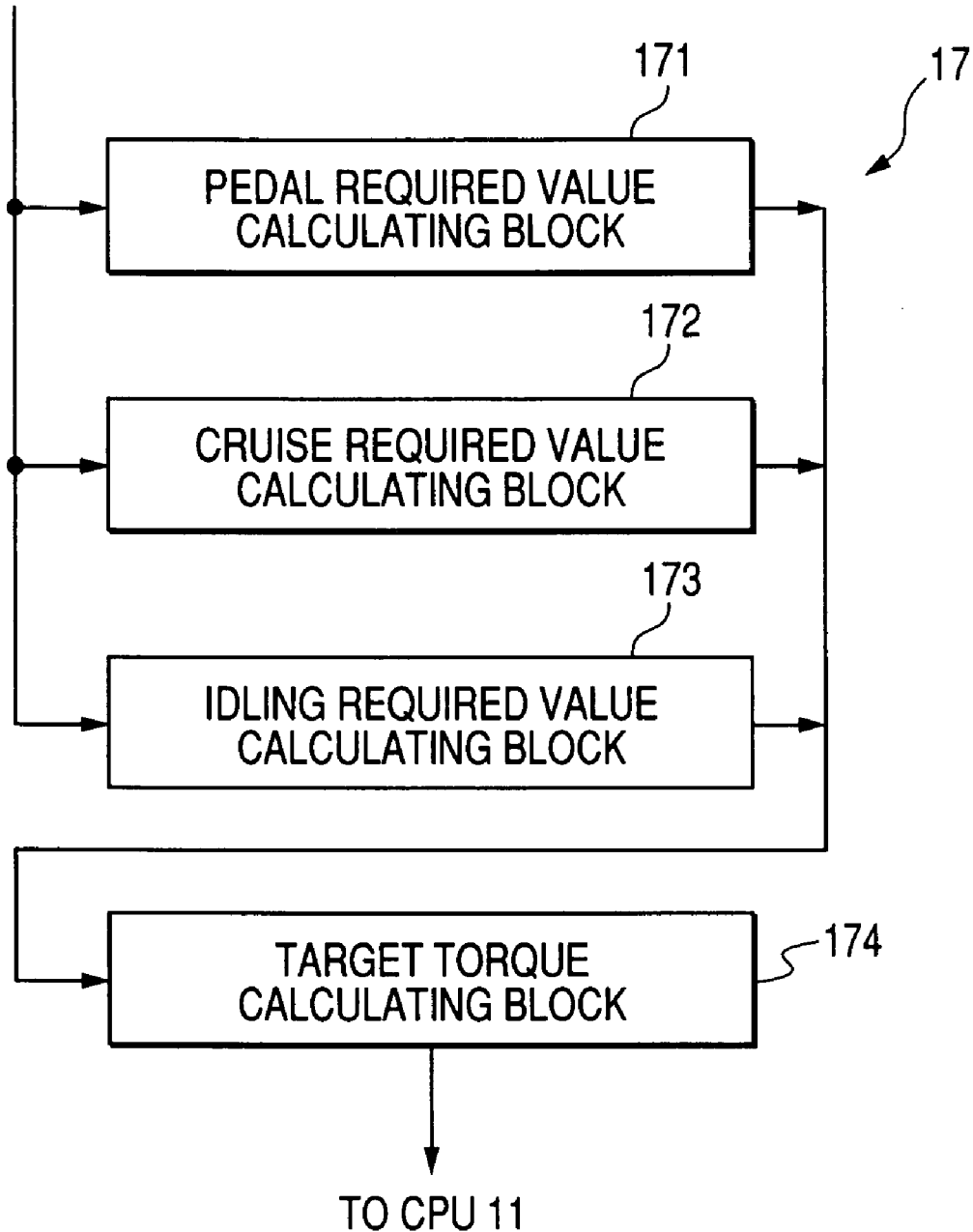
FIG. 3 is a block diagram of an FPU of a controller shown in FIG. 1.

FIG. 2 is a block diagram of the CPU 11 according to the embodiment, and FIG. 3 is a block diagram of the FPU 17 according to the embodiment.

As shown in FIG. 2, the CPU 11 has a receiving and transmitting section 111, a parameter generating section 112, a converting section 113, a failure judging section 114, and a calculating and outputting section 115.

The section 111 receives detected parameters from the sensors 200, transmits the detected parameters to the FPU 17 to cause the FPU 17 to generate a floating-point control parameter relating to a first quantity of control for the injectors 120 from the detected parameters on the basis of floating-point calculations, and receives the floating-point control parameter from the FPU 17. The reception of this parameter is performed by executing a control parameter receiving segment of a computer program for generating a control signal, and this program is loaded in the CPU 11.

The section 112 generates a fixed-point control parameter relating to a second quantity of control for the injectors 120 from the detected parameters on the basis of fixed-point calculations. The generation of this parameter is performed by executing a control parameter generating segment of the computer program.

The section 113 converts the floating-point control parameter of the floating-point representation into a converted control parameter of the fixed-point representation. This conversion is performed by executing a converting segment of the computer program.

The section 114 compares the converted control parameter with the fixed-point control parameter of the fixed-point representation to obtain a comparison result and judges from the comparison result whether or not a failure or fault occurs in the FPU 17. When the section 114 judges that the FPU 17 is normally operated, the section 114 outputs a normal operation signal to the section 115. In contrast, when the section 114 judges that a failure has occurred in the FPU 17, the section 114 outputs a fail-safe operation signal to the section 115. These comparison and judgment are performed by executing a judging segment of the computer program.

In response to the normal operation signal, the section 115 generates a normal control signal indicating the first quantity of control from the floating-point control parameter and outputs this signal to an actuator. The actuator is operated according to the normal control signal so as to give the first quantity of control to a controlled object. For example, the driving circuit 110 receives the normal control signal, and the injectors 120 driven by the driving circuit 110 inject a controlled quantity of fuel into the engine 100. This generation of the control signal is performed by executing a control signal generating segment of the computer program, and the outputting of the signal is performed by executing an outputting segment of the computer program.

Further, in response to the fail-safe operation signal, the section 115 generates a fail-safe control signal indicating a fail-safe quantity of control and outputs this signal to an actuator. The actuator is operated according to the fail-safe control signal so as to give the fail-safe quantity of control to a controlled object. For example, the driving circuit 110 receives the fail-safe control signal, and the injectors 120 driven by the driving circuit 110 inject a suitable quantity of fuel required of the engine 100 to safely drive the vehicle.

More specifically, the section 112 of the CPU 11 has a pedal required value calculating block 32, a cruise required value calculating block 34, an idling required value calculating block 36, and a target torque calculating block 38. The block 32 calculates a pedal required value at fixed-point calculations from a stroke position of an accelerator pedal representing a detected parameter. The pedal required value indicates a torque value required of the engine 100 to drive the vehicle in response to the driver's requirement. The block 34 calculates a cruise required value at fixed-point calculations from a target speed of the vehicle representing a detected parameter. The cruise required value indicates a torque value required of the engine 100 to keep driving the vehicle at the target speed. The block 36 calculates an idling required value at fixed-point calculations from data of idling which is stored in the RAM 15 and represents a detected parameter. The idling required value indicates a torque value required of the engine 100 to keep the vehicle in an idling condition. The block 38 adds the idling required value received from the block 36 to the pedal required value or the cruise required value received from the block 32 or 34 to obtain a target torque representing a fixed-point control parameter. This target torque is obtained based on the fixed-point calculations of the CPU 11 and is called a target torque based on CPU 11. The block 38 outputs this target torque to the section 114.

As shown in FIG. 3, the FPU 17 has a pedal required value calculating block 171, a cruise required value calculating block 172, an idling required value calculating block 173, and a target torque calculating block 174. The block 171 calculates a pedal required value from the stroke position of the accelerator pedal at floating-point calculations. The block 172 calculates a cruise required value from the target speed of the vehicle at floating-point calculations. The block 173 calculates an idling required value from the data of idling at floating-point calculations. The block 174 adds the idling required value to the pedal required value or the cruise required value to obtain a target torque of the floating-point representation. This target torque represents a floating-point control parameter. The FPU 17 transmits this target torque to the section 113 of the CPU 11. Data of the floating-point representation is, for example, expressed by 4 bytes (32 bits) according to IEEE-754 Standard and has a sign part of 1 bit, an exponential part of 8 bits and a mantissa of 23 bits. Therefore, this floating-point representation has resolution of 7 digits (i.e., resolution of 0.0000001).

Returning to FIG. 2, the section 113 has a conversion possibility checking block 52 and a converting block 54. The block 52 checks whether or not the target torque of the floating-point representation received from the FPU 17 can be expressed by fixed-point data of a predetermined fixed-point representation set at a predetermined data length. For example, when the fixed-point data is preset to be expressed by 2 bytes (i.e., 16 bits) at an offset set at zero, the target torque of the floating-point representation exceeding a value of 65536 (i.e., $2^{16}$) or lower than zero cannot be converted into a value of the fixed-point representation. The block 54 converts the target torque of the floating-point representation into a converted target torque of the fixed-point representation when the block 52 judges that the target torque of the floating-point representation can be expressed by fixed-point data. This converted target torque represents a converted control parameter. Because this converted target torque is obtained based on the floating-point calculations of the FPU 17, this target torque is called a target torque based on FPU 17.

In the conversion of floating-point data (i.e., floating-point control parameter) into fixed-point data (i.e., fixed-point control parameter), least significant bit (LSB) data in the floating-point data and offset data are used. The LSB data expresses a physical value corresponding to a lowest bit of fixed-point data. The offset data indicates a position of a base point (i.e., a value regarded as zero) in fixed-point data, and the base point divides the fixed-point data into an integral part and a decimal part. For example, in a hexadecimal numeration system, the offset data is set at a hexadecimal number "0x7FFF". In this case, a hexadecimal number "0x0000" indicates a negative decimal number "−32767", and a hexadecimal number "0xFFFF" indicates a decimal number "32768".

To convert a floating-point control parameter into a fixed-point control parameter, an offset value indicated by the offset data is added to the floating-point control parameter to obtain a non-offset value, the non-offset value is divided by a value of the LSB data to obtain a divided value, and a decimal part of the divided value is subtracted from the divided value to obtain an integral part of the divided value. The integral part of the divided value is output from the block 54 as a converted control parameter of fixed-point representation.

The section 114 has an absolute difference calculating block 56 and a judging block 58. The block 56 calculates an absolute value of a difference between the target torque based on FPU 17 and the target torque based on CPU 11. The block 58 compares the absolute value obtained in the block 56 with a predetermined threshold value. This threshold value is set such that the absolute value can easily exceed the threshold value when a failure has occurred in the FPU 17, and the threshold value can be arbitrarily set. In a case where the absolute value is larger than the threshold value, the block 58 judges that a failure has occurred in the FPU 17 and generates a fail-safe operation signal. In other cases, the block 58 judges that no failure has occurred in the FPU 17 and generates a normal operation signal.

For example, in case of a stroke position of the accelerator pedal set at 55% and an engine speed set at 750 rpm, a pedal required value is calculated at 156.78 Nm. Further, a cruise required value is set at 0 Nm, and an idle required value is equal to 10.23 Nm. In this case, the CPU 11 judges that the vehicle is not being run in a cruise mode, and the pedal required value is adopted. Therefore, the block 174 obtains a value of 167.01 Nm (=156.78+10.23) as a floating-point target torque. In case of the LSB data set at 10/256 and the offset data set at 0, the block 32 obtains a value of 4013 (integral part of 156.78÷(10/256)) as a pedal required value of the fixed-point representation, the block 36 obtains a value of 261 (integral part of 10.23÷(10/256)) as an idling required value of the fixed-point representation, and the block 38 obtains a value of 4274 (=4013+261) as a target torque based on CPU 11. Further, the block 54 obtains a value of 4275 (integral part of 167.01÷(10/256)) as a target torque based on FPU 17, and the block 56 obtains a value of 1 (=|4275−4274|) as an absolute difference. In case of a threshold value set at 100, the block 58 judges that the FPU 17 is normally operated.

The section 115 has a control pattern calculating block 42 and a driving control block 44. In response to the normal operation signal, the block 42 calculates an injection control pattern of fuel injected from the injectors 120 from the target torque of the floating-point representation received from the FPU 17, and the block 44 generates a normal control signal indicating the control pattern and outputs this signal to the driving circuit 110. Therefore, the injectors 120 driven by the driving circuit 110 inject fuel at the control pattern such that the engine 100 generates the target torque of the floating-point representation.

Further, in response to the fail-safe operation signal, the block 42 calculates a fail-safe injection pattern of fuel injected from the injectors 120, and the block 44 generates a fail-safe control signal indicating the fail-safe injection pattern and outputs this signal to the driving circuit 110. Therefore, the injectors 120 driven by the driving circuit 110 inject fuel at the fail-safe injection pattern such that the engine 100 generates a fail-safe torque so as to safely run the vehicle. In addition to this fail-safe operation, an alarm may be displayed on a display of the vehicle, or the CPU 11 may inform a driver that a failure has occurred in the FPU 17.

Figure 4:
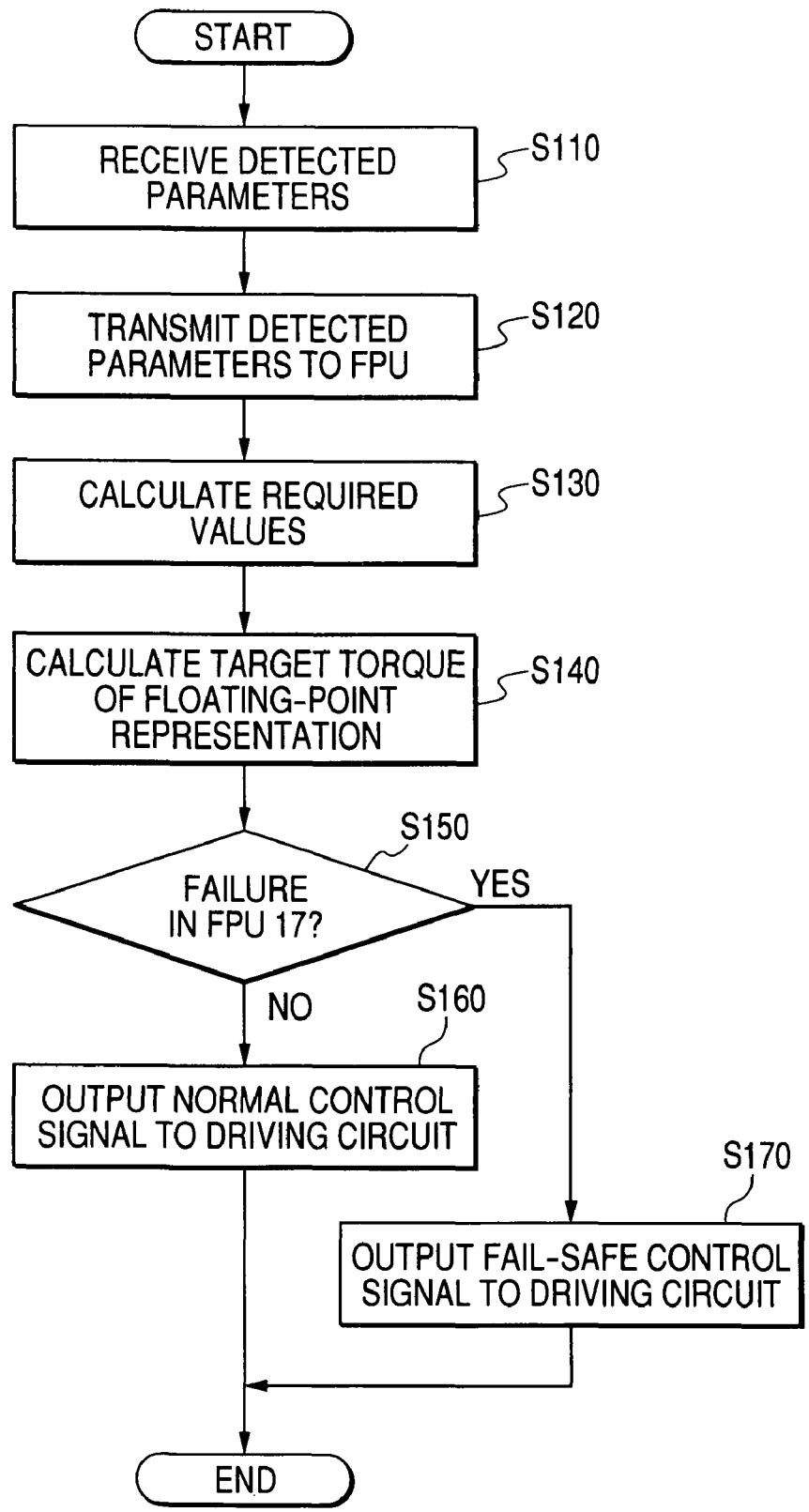
FIG. 4 is a flowchart showing the procedure of an actuator control operation of the controller according to the embodiment.

An operation of the controller 10 is described with reference to FIG. 4 and FIG. 5. FIG. 4 is a flow chart showing the procedure of an actuator control operation of the controller 10 according to the embodiment.

As shown in FIG. 4, at step S110, when a cruise setting section (not shown) of the vehicle is set to a cruise control, the section 111 of the CPU 11 receives data indicating a target speed of the vehicle from the cruise setting section as a detected parameter. When the vehicle is not set to a cruise control, the section 111 of the CPU 11 receives data indicating a stroke position of an accelerator pedal from the acceleration stroke sensor 200 as a detected parameter. Further, the section 111 of the CPU 11 reads out data of idling from the RAM 15 as another detected parameter.

At step S120, the section 111 of the CPU 11 transmits the detected parameters to the FPU 17.

At step S130, when receiving the data of the target speed and the data of idling, the FPU 17 calculates a cruise required value and an idling required value from the data at floating-point calculations. When receiving the data of stroke position and the data of idling, the FPU 17 calculates a pedal required value and an idling required value from the data at floating-point calculations.

At step S140, the FPU 17 calculates a target torque of the floating-point representation as a floating-point control parameter by adding the idling required value to the cruise required value or the pedal required value. The FPU 17 transmits the target torque of the floating-point representation to the CPU 11.

At step S150, the sections 112, 113 and 114 of the CPU 11 perform a failure detecting operation based on the target torque of the floating-point representation and judges whether or not a failure has occurred in the FPU 17. When the CPU 11 judges that no failure has occurred in the FPU 17, the procedure proceeds to a step S160. In other cases, the procedure proceeds to a step S170.

At step S160, the section 114 outputs a normal operation signal to the section 115. In response to the normal operation signal, the section 115 of the CPU 11 generates a normal control signal indicating a control quantity of fuel from the target torque of the floating-point representation received from the FPU 17. Then, the CPU 11 outputs the normal control signal to the driving circuit 110 representing an actuator. Therefore, the injectors 120 representing the actuator inject a control quantity of fuel to the respective cylinders of the engine 110 representing a controlled object.

At step S170, the section 114 outputs a fail-safe operation signal to the section 115. In response to the fail-safe operation signal, the section 115 generates a fail-safe control signal indicating a suitable control quantity of fuel required of the engine 100 to safely drive the vehicle. Then, the CPU 11 outputs the fail-safe control signal to the driving circuit 110. Therefore, the injectors 120 inject a suitable control quantity of fuel to the engine 110.

Figure 5:
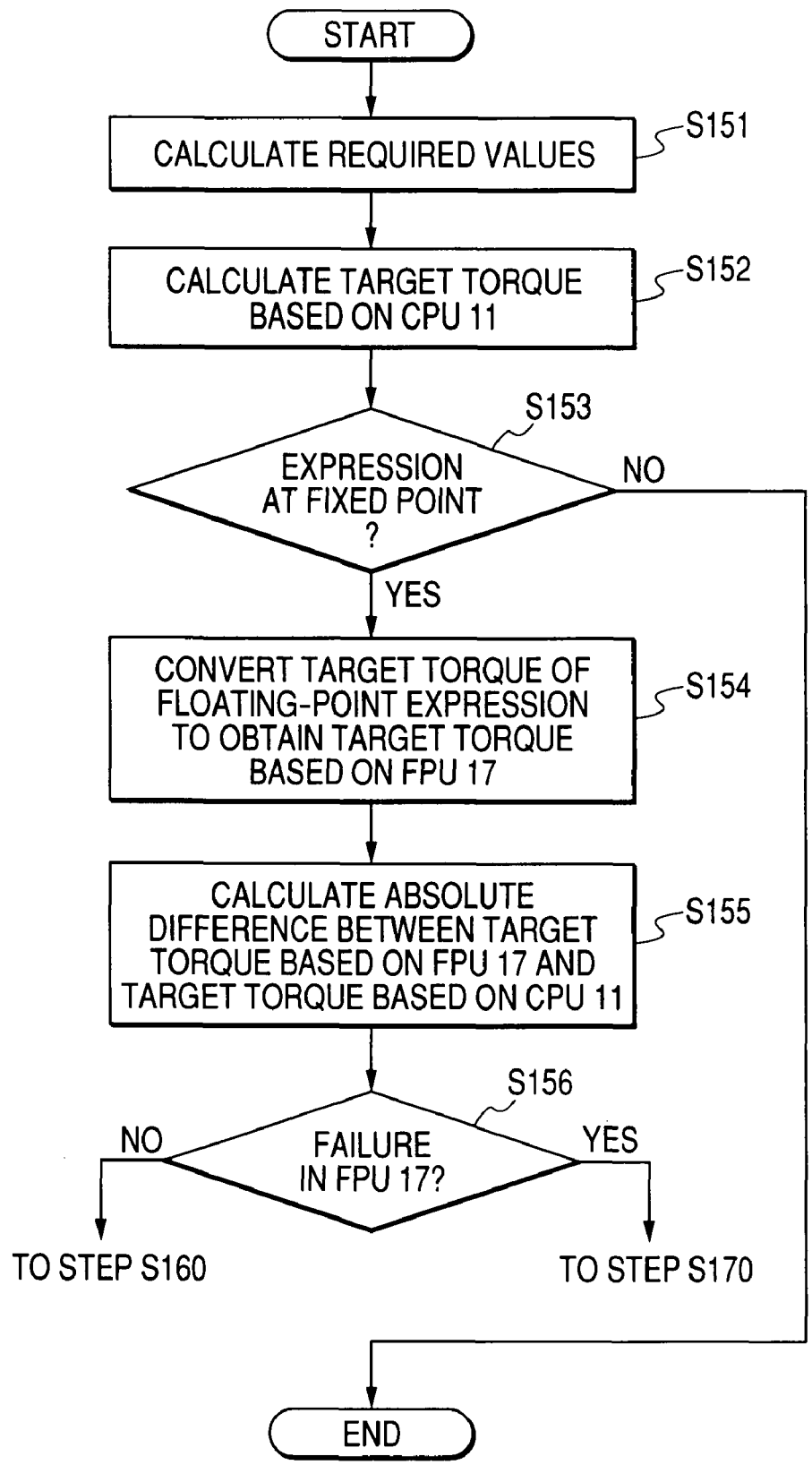
FIG. 5 is a flow chart showing the procedure of a failure detecting operation performed in the control operation shown in FIG. 4.

FIG. 5 is a flow chart showing a failure detecting operation performed at step S150 in the CPU 11 according to the embodiment.

As shown in FIG. 5, to perform the failure detecting operation, at step S151, when the section 111 receives data of target speed and data of idling, the section 112 of the CPU 11 calculates a cruise required value and an idling required value from the data at fixed-point calculations. When the section 111 receives data of stroke position and data of idling, the section 112 calculates a pedal required value and an idling required value from the data at fixed-point calculations.

At step S152, the section 112 calculates a target torque of the fixed-point representation from the required values as a fixed-point control parameter. This target torque is called a target torque based on CPU 11.

At step S153, the section 113 of the CPU 11 judges whether or not the target torque of the floating-point representation received from the FPU 17 can be expressed at a fixed-point type. When the target torque can be expressed at a fixed point type, the procedure proceeds to a step S154. In other case, the failure detecting operation is finished. In this case, a control signal is, for example, generated from the target torque based on CPU 11, and the driving circuit 110 and injectors 120 representing the actuator control the engine 100 according to the control signal.

At step S154, the section 113 of the CPU 11 converts the target torque of the floating-point representation into a target torque of the fixed-point representation. This target torque is called a target torque based on FPU 17.

At step S155, the section 114 of the CPU 11 calculates an absolute value of a difference between the target torque based on FPU 17 and the target torque based on CPU 11.

At step S156, the section 114 judges based on the absolute value whether or not a failure has occurred in the FPU 17. When the absolute value is larger than a predetermined threshold value, the section 114 judges that a failure has occurred in the FPU 17, and the procedure proceeds to step S170. In another case, the section 114 judges that the FPU 17 is normally operated, and the procedure proceeds to step S160.

Accordingly, the CPU 11 can reliably detect a failure occurring in the FPU 17 from the absolute difference between the target torque based on FPU 17 and the target torque based on CPU 11, and the CPU 11 can correctly generate a control signal from a floating-point control parameter of the FPU 17 normally operated. The controller 10 can control an actuator such that the actuator gives a quantity of control to a controlled object according to the control signal.

Further, because the control signal is generated from the floating-point control parameter, the controller 10 can control the actuator with higher precision.

Moreover, because the threshold value can be adjusted in dependence on conditions of the controller 10 in the vehicle, the failure detection can be performed with a precision suitable to the conditions of the controller 10. For example, when the controller 10 is used under circumstances causing a comparatively large error in the controller 10, the threshold value may be set at a comparatively large value to normally operate a controlled object regardless of the large error in the controller 10. In contrast, when the controller 10 is used under circumstances causing no large error in the controller 10, the threshold value may be set at a low value to detect a failure in the FPU 17 with high precision.

Furthermore, because the LSB data and the offset data are used for the conversion from floating-point data into fixed-point data, this conversion can be smoothly performed.

Still further, because the absolute value of the difference between the target torque based on FPU 17 and the target torque based on CPU 11 is compared with the threshold value, the occurrence of a failure in the FPU 17 can be judged at a constant judging criterion regardless of whether the target torque based on FPU 17 is larger or smaller than the target torque based on CPU 11.

Still further, the failure detecting operation is forcedly finished when at least one of the required values of the floating-point representation becomes out of a range for the fixed-point representation. Therefore, there is no probability that a target torque of the floating-point representation is erroneously converted into a target torque of the fixed-point representation. Accordingly, the CPU 11 can reliably prevent the occurrence of a failure in the FPU 17 being erroneously judged.

Modifications

In this embodiment, the occurrence of a failure in the FPU 17 is judged based on a difference between the target torque based on CPU 11 and the target torque based on FPU 17. However, the occurrence of a failure in the FPU 17 may be judged based on a difference between a fixed-point value obtained from at least one of the floating-point required values and the corresponding fixed-point required value obtained in the CPU 11. Further, the occurrence of a failure in the FPU 17 may be judged based on both a difference between the target torque based on CPU 11 and the target torque based on FPU 17 and a difference between a fixed-point value derived from one floating-point required value of the FPU 17 and the corresponding fixed-point required value obtained in the CPU 11.

Further, the occurrence of a failure in the FPU 17 may be judged based on differences between a group of all required values calculated in the CPU 11 and a group of fixed-point required values derived from all floating-point required values of the FPU 17. This modified failure detecting operation performed at step S150 in the CPU 11 is described with reference to FIG. 6.

Figure 6:
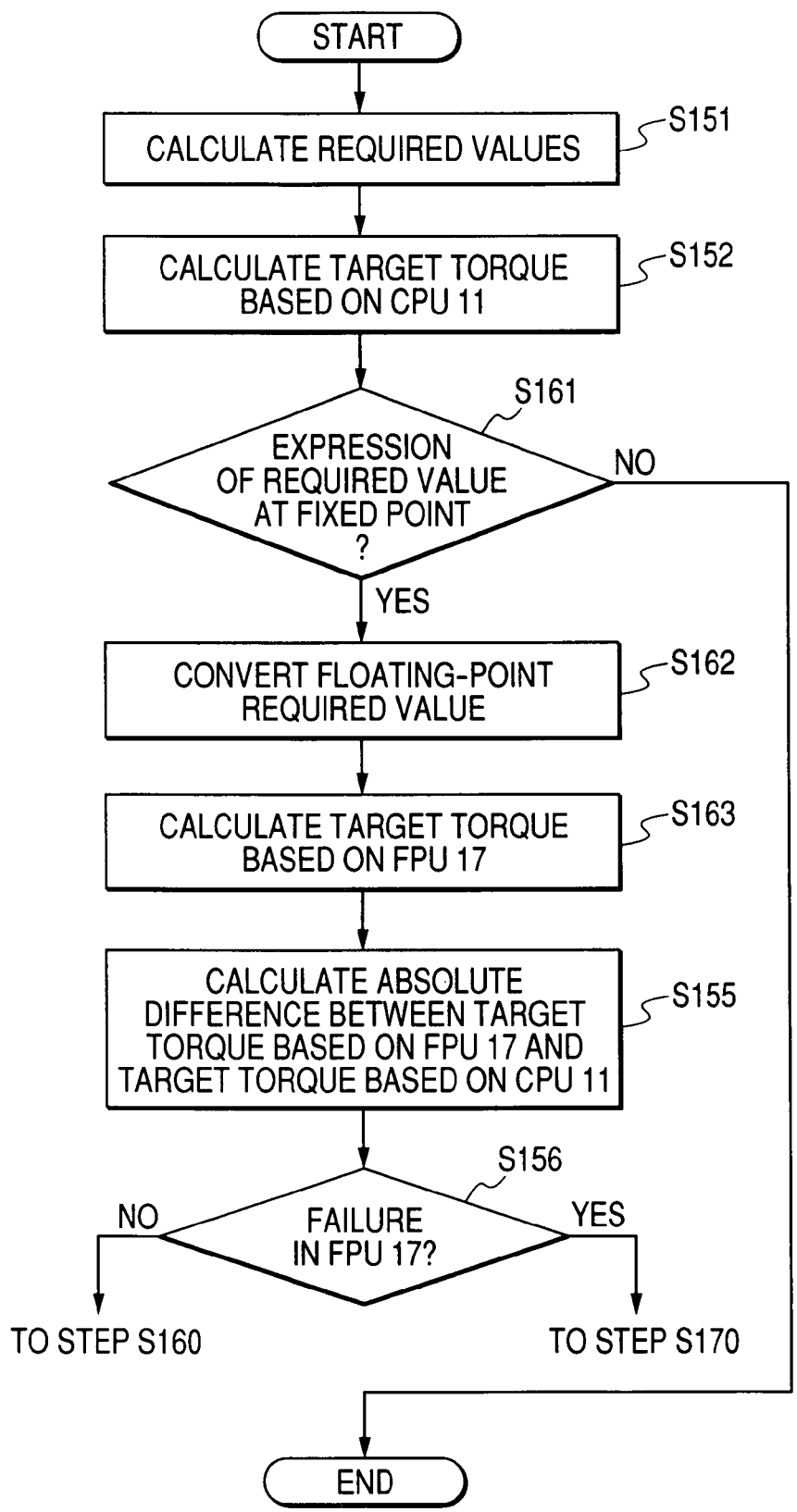
FIG. 6 is a flow chart showing the procedure of a failure detecting operation performed in the CPU according to a first modification of the embodiment.

As shown in FIG. 6, a target torque based on CPU 11 is calculated at steps S151 and S152. In this case, the calculation of the required values in the CPU 11 may be simplified to reduce a load of calculations on the CPU 11.

At step S161, the section 113 of the CPU 11 judges whether or not all floating-point required values received from the FPU 17 can be expressed at fixed-point data. When all floating-point required values of the FPU 17 can be expressed by fixed-point data, the procedure proceeds to step S162. In contrast, when at least one of floating-point required values of the FPU 17 cannot be expressed by fixed-point data, the failure detecting operation is finished.

At step S162, the section 113 of the CPU 11 converts each of the floating-point required values of the FPU 17 into a fixed-point required value.

At step S163, the section 113 adds the idle required value to the pedal or cruise required value to obtain a fixed-point target torque as a target torque based on FPU 17. Thereafter, steps S155 and S156 are performed in the same manner as the embodiment.

Figure 7:
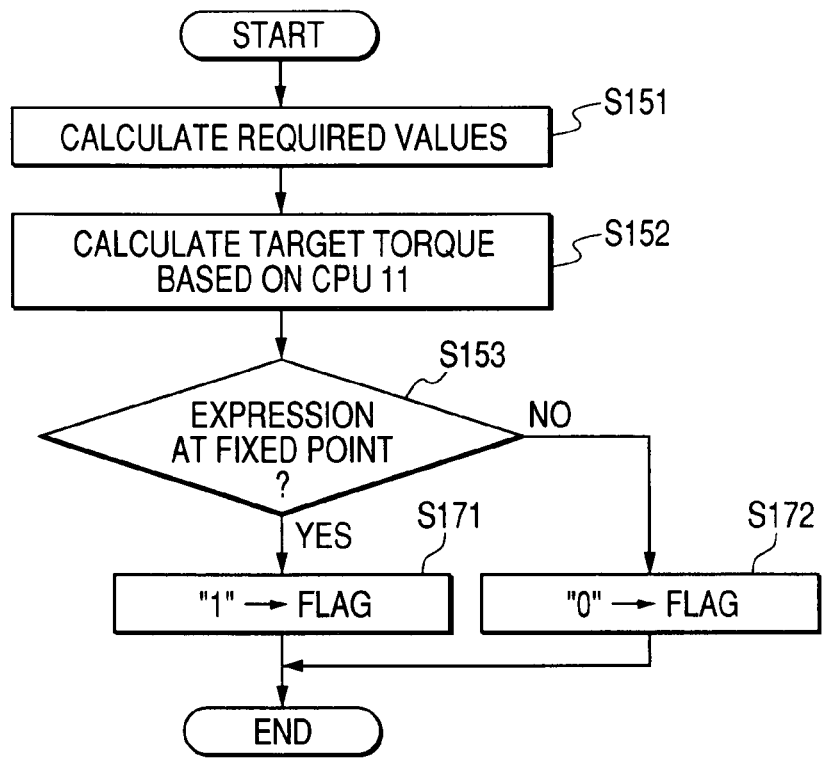
FIG. 7 is a flow chart showing the procedure of a conversion possibility judging operation according to a second modification of the embodiment.

Moreover, the failure detecting operation shown in FIG. 5 may be divided into a conversion possibility judging operation and a failure detecting operation performed after the conversion possibility judging operation. FIG. 7 is a flow chart showing the procedure of a conversion possibility judging operation according to another modification of the embodiment, while FIG. 8 is a flow chart showing the procedure of a failure detecting operation.

As shown in FIG. 7, after steps S151 and S152, when the CPU 11 judges at step S153 that the floating-point target torque received from the FPU 17 can be expressed by fixed-point data, the CPU 11 sets a flag at "1" at step S171. In other case, the CPU 11 sets a flag at "0" at step S172.

Figure 8:
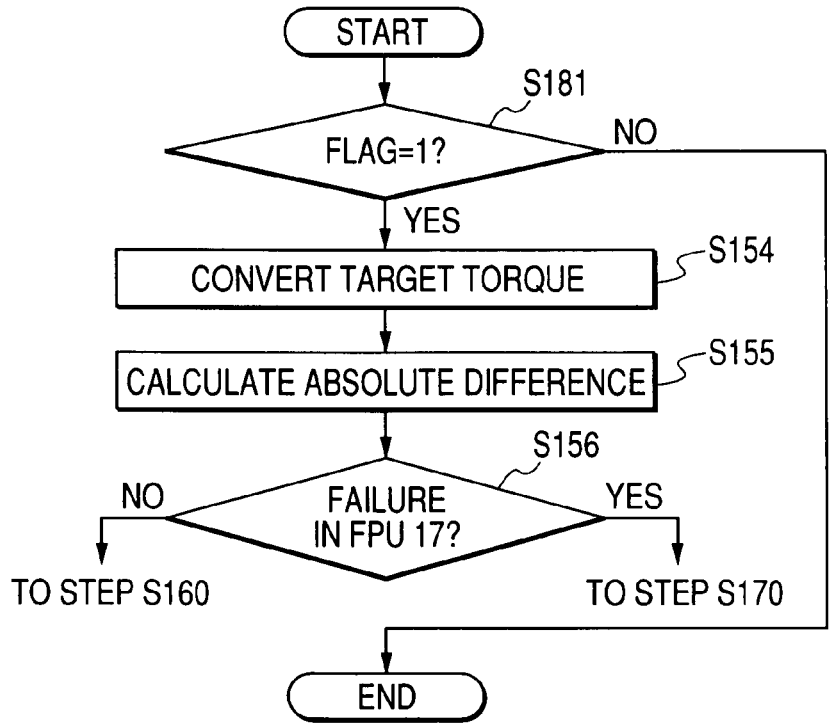
FIG. 8 is a flow chart showing the procedure of a failure detecting operation according to the second modification.

As shown in FIG. 8, at step S181, the CPU 11 judges whether or not the flag is equal to "1". When the CPU 11 detects the flag set at "1", steps S154 to 156 are performed in the same manner as in the embodiment. In contrast, when the CPU 11 detects the flag set at "0", the failure detecting operation is finished.

The embodiment and modifications should not be construed as limiting the present invention to structures of those embodiment and modifications, and the structure of this invention may be combined with that based on the prior art. For example, parameters detected in the sensors 200 are transmitted to the FPU 17 through the CPU 11 in this embodiment. However, the parameters may be directly transmitted to the FPU 17 without passing the CPU 11, in addition to the CPU 11.

Further, the controller 10 is used for the ECU 1 of the engine control system. However, the controller 10 may be used for any control system such as a cooling system.

Moreover, the judgment of the CPU 10 used for the engine control system is performed by using the target torque required of the engine 200 controlled by the system. However, the judgment of the CPU 10 may be performed by using a control parameter required to control another system such as a cooling system.

Furthermore, the occurrence of a failure in the FPU 17 is judged based on an absolute value of the difference between the target torque based on FPU 17 and the target torque based on CPU 11. However, the occurrence of a failure in the FPU 17 may be judged based on a combination of the target torque based on FPU 17 and the target torque based on CPU 11. For example, the occurrence of a failure may be judged based on a ratio of the target torque based on FPU 17 to the target torque based on CPU 11.

What is claimed is:

1. A processing unit comprising:
   a parameter receiving section which receives a floating-point control parameter generated in a floating-point processor from a detected parameter on the basis of a floating-point calculation, the floating-point control parameter indicating a first quantity of control for a controlled object;
   a parameter generating section which receives the detected parameter and generates a fixed-point control parameter indicating a second quantity of control for the controlled object from the detected parameter on the basis of a fixed-point calculation;
   a converting section which converts the floating-point control parameter of floating-point representation into a converted control parameter of fixed-point representation;
   a failure judging section which judges from comparison between the converted control parameter of fixed-point representation and the fixed-point control parameter whether or not a failure has occurred in the floating-point processor;
   a signal generating section which generates a control signal from the floating-point control parameter when the failure judging section judges that no failure has occurred in the floating-point processor; and
   a signal outputting section which outputs the control signal to an actuator such that the actuator is operated according to the control signal so as to give the first quantity of control to the controlled object,
   wherein the failure judging section has a conversion possibility checking block which judges whether or not the floating-point control parameter of floating-point representation can be expressed by fixed-point data of a predetermined fixed-point representation, and a converting block which performs the conversion when the conversion possibility checking block judges that the floating-point control parameter of floating-point representation can be expressed by fixed-point data.

2. The processing unit according to claim 1, wherein the failure judging section is adapted to judge that a failure has occurred in the floating-point processor when a difference between the converted control parameter and the fixed-point control parameter is larger than a predetermined value.

3. The processing unit according to claim 2, wherein the judgment of the failure judging section is based on an absolute value of the difference.

4. The processing unit according to claim 1, wherein the converting section is adapted to perform the conversion by using least significant bit data of the floating-point control parameter and offset data, the least significant bit data expresses a physical value corresponding to a lowest bit of the converted control parameter, and the offset data indicates a position of a base point in the converted control parameter.

5. The processing unit according to claim 1, wherein the floating-point control parameter is obtained as a result of a predetermined floating-point calculation among a plurality of floating-point calculations possible to be performed in the floating-point processor.

6. The processing unit according to claim 1, wherein the signal generating section is adapted to generate a fail-safe control signal indicating a fail-safe quantity of control for the controlled object when the failure judging section judges that a failure has occurred in the floating-point processor, and the signal outputting section is adapted to output the fail-safe control signal to the actuator such that the actuator is operated according to the fail-safe control signal so as to give the fail-safe quantity of control to the controlled object.

* * * * *